United States Patent
Miyata et al.

(10) Patent No.: US 7,531,933 B2
(45) Date of Patent: May 12, 2009

(54) PERMANENT MAGNET ROTATING MACHINE

(75) Inventors: Koji Miyata, Echizen (JP); Hajime Nakamura, Echizen (JP); Koichi Hirota, Echizen (JP); Takehisa Minowa, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/846,690

(22) Filed: Aug. 29, 2007

(65) Prior Publication Data
US 2008/0054736 A1    Mar. 6, 2008

(30) Foreign Application Priority Data
Aug. 30, 2006    (JP)    ............... 2006-233442

(51) Int. Cl.
H02K 1/27    (2006.01)
(52) U.S. Cl. .................. 310/156.38; 310/156.45; 310/44
(58) Field of Classification Search ............ 310/156.38, 310/156.45, 44
See application file for complete search history.

(56) References Cited

U.S. PATENT DOCUMENTS

| | | | | |
|---|---|---|---|---|
| 5,034,146 A | * | 7/1991 | Ohashi et al. ............. | 252/62.57 |
| 5,223,759 A | * | 6/1993 | Shimoda et al. ........ | 310/156.54 |
| 5,405,455 A | * | 4/1995 | Kusunoki et al. .......... | 148/103 |
| 5,682,670 A | * | 11/1997 | Bell et al. ..................... | 29/609 |
| 6,140,728 A | * | 10/2000 | Tomita et al. ......... | 310/156.12 |
| 6,707,209 B2 | * | 3/2004 | Crapo et al. ........... | 310/156.43 |
| 6,858,960 B1 | * | 2/2005 | Muszynski ............. | 310/156.47 |
| 2002/0067092 A1 | * | 6/2002 | Crapo et al. ........... | 310/156.47 |
| 2006/0213582 A1 | | 9/2006 | Nakamura et al. | |
| 2006/0213583 A1 | | 9/2006 | Nakamura et al. | |
| 2006/0213584 A1 | | 9/2006 | Nakamura et al. | |
| 2006/0213585 A1 | | 9/2006 | Nakamura et al. | |
| 2008/0245442 A1 | | 10/2008 | Nakamura et al. | |

FOREIGN PATENT DOCUMENTS

JP    5021218 A    1/1993

(Continued)

OTHER PUBLICATIONS

K.-D. Durst et al; "The Coercive Field Of Sintered and Melt-Spun NdFeB Magnets". Journal of Magnetism and Magnetic Materials, 68 (1987), 63-75.

(Continued)

*Primary Examiner*—Quyen P Leung
*Assistant Examiner*—Naishadh N Desai
(74) *Attorney, Agent, or Firm*—Westerman, Hattori, Daniels & Adrian, LLP.

(57) ABSTRACT

In a rotating machine comprising a rotor including a rotor core and a plurality of permanent magnet segments, and a stator including a stator core and windings, the permanent magnet segment is obtained by disposing a powder comprising an $R^2$ oxide, $R^3$ fluoride or $R^4$ oxyfluoride on a sintered magnet body of $R^1$—Fe—B composition, wherein $R^1$ to $R^4$ are rare earth elements, and heat treating the powder-covered magnet body. The permanent magnet segment of a cross-sectional shape which is tapered from the center toward opposed ends has a higher coercive force at the ends than at the center.

5 Claims, 2 Drawing Sheets

FOREIGN PATENT DOCUMENTS

| | | | |
|---|---|---|---|
| JP | 531807 B2 | | 5/1993 |
| JP | 11186012 A | * | 7/1999 |
| JP | 11251125 A | * | 9/1999 |
| JP | 2003197412 A | * | 7/2003 |
| JP | 2003257721 A | * | 9/2003 |
| JP | 2004165482 A | * | 6/2004 |

OTHER PUBLICATIONS

K. T. Park et al; "Effect of Metal-Coating Consecutive Heat Treatment on Coercivity of Thin Nd-Fe-B Sintered Magnets"; p. 257 (2000).

K. Ito et al; "Grain Boundary Tailoring of Nd-Fe-B Sintered Magnets and Their Magnetic Properties"; Proceedings of the 2004 Spring Meeting of the Powder & Powder Metallury Society, p. 202.

* cited by examiner

PERMANENT MAGNET ROTATING MACHINE

CROSS-REFERENCE TO RELATED APPLICATION

This non-provisional application claims priority under 35 U.S.C. §119(a) on Patent Application No. 2006-233442 filed in Japan on Aug. 30, 2006, the entire contents of which are hereby incorporated by reference.

TECHNICAL FIELD

This invention relates to a permanent magnet rotating machine comprising an R—Fe—B permanent magnet obtained by increasing the coercive force of a sintered magnet body while suppressing a decline of remanence (or residual flux density) and more particularly, to a permanent magnet rotating machine best suited as a FA motor or electric power steering motor using a magnet having tapered end portions for the purpose of reducing cogging torque.

BACKGROUND ART

By virtue of excellent magnetic properties, Nd—Fe—B permanent magnets find an ever increasing range of application. In the field of rotating machines such as motors and power generators, permanent magnet rotating machines using Nd—Fe—B permanent magnets have recently been developed in response to the demands for weight and size reduction, performance improvement, and energy saving. The permanent magnets within the rotating machine are exposed to elevated temperature due to the heat generation of windings and iron cores and kept susceptible to demagnetization by a diamagnetic field from the windings. There thus exists a need for a Nd—Fe—B sintered magnet having heat resistance, a certain level of coercive force serving as an index of demagnetization resistance, and a maximum remanence serving as an index of magnitude of magnetic force.

An increase in the remanence of Nd—Fe—B sintered magnets can be achieved by increasing the volume factor of $Nd_2Fe_{14}B$ compound and improving the crystal orientation. To this end, a number of modifications have been made on the process. For increasing coercive force, there are known different approaches including grain refinement, the use of alloy compositions with greater Nd contents, and the addition of effective elements. The currently most common approach is to use alloy compositions having Dy or Tb substituted for part of Nd. Substituting these elements for Nd in the $Nd_2Fe_{14}B$ compound increases both the anisotropic magnetic field and the coercive force of the compound. The substitution with Dy or Tb, on the other hand, reduces the saturation magnetic polarization of the compound. Therefore, as long as the above approach is taken to increase coercive force, a loss of remanence is unavoidable.

In Nd—Fe—B magnets, the coercive force is given by the magnitude of an external magnetic field created by nuclei of reverse magnetic domains at grain boundaries. Formation of nuclei of reverse magnetic domains is largely dictated by the structure of the grain boundary in such a manner that any disorder of grain structure in proximity to the boundary invites a disturbance of magnetic structure, helping formation of reverse magnetic domains. It is generally believed that a magnetic structure extending from the grain boundary to a depth of about 5 nm contributes to an increase of coercive force. See K. D. Durst and H. Kronmuller, "THE COERCIVE FIELD OF SINTERED AND MELT-SPUN NdFeB MAGNETS," Journal of Magnetism and Magnetic Materials, 68 (1987), 63-75. The inventors discovered in JP-B 5-31807 that when a slight amount of Dy or Tb is concentrated only in proximity to the interface of grains for thereby increasing the anisotropic magnetic field only in proximity to the interface, the coercive force can be increased while suppressing a decline of remanence. Further the inventors established a method of producing a magnet comprising separately preparing a $Nd_2Fe_{14}B$ compound composition alloy and a Dy or Tb-rich alloy, mixing and sintering as disclosed in JP-A 5-21218. In this method, the Dy or Tb-rich alloy becomes a liquid phase during the sintering step and is distributed so as to surround the $Nd_2Fe_{14}B$ compound. As a result, substitution of Dy or Tb for Nd occurs only in proximity to grain boundaries of the compound, which is effective in increasing coercive force while suppressing a decline of remanence.

The above method, however, suffers from some problems. Since a mixture of two alloy fine powders is sintered at a temperature as high as 1,000 to 1,100° C., Dy or Tb tends to diffuse not only at the interface of $Nd_2Fe_{14}B$ crystal grains, but also into the interior thereof. An observation of the structure of an actually produced magnet reveals that Dy or Tb has diffused in a grain boundary surface layer to a depth of about 1 to 2 microns from the interface, and the diffused region accounts for a volume fraction of 60% or above. As the diffusion distance into crystal grains becomes longer, the concentration of Dy or Tb in proximity to the interface becomes lower. Lowering the sintering temperature is effective to minimize the excessive diffusion into crystal grains, but not practically acceptable because low temperatures retard densification by sintering. An alternative approach of sintering a compact at low temperature under a stress applied by a hot press or the like is successful in densification, but entails an extreme drop of productivity.

Another method for increasing coercive force is known in the art which method comprises machining a sintered magnet into a small size, applying Dy or Tb to the magnet surface by sputtering, and heat treating the magnet at a lower temperature than the sintering temperature for causing Dy or Tb to diffuse only at grain boundaries. See K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000), and K. Machida, H. Kawasaki, S. Suzuki, M. Ito and T. Horikawa, "Grain Boundary Tailoring of Nd—Fe—B Sintered Magnets and Their Magnetic Properties," Proceedings of the 2004 Spring Meeting of the Powder & Powder Metallurgy Society, p. 202. Since Dy or Tb is effectively concentrated at grain boundaries, this method succeeds in increasing the coercive force without substantial sacrifice of remanence. This method is applicable to only magnets of small size or thin gage for the reason that as the magnet has a larger specific surface area, that is, as the magnet is smaller in size, a larger amount of Dy or Tb is available. However, the application of metal coating by sputtering poses the problem of low productivity.

In AC servo motors, for example, a permanent magnet rotating machine with a radial air gap as illustrated in FIG. 1 is used. This permanent magnet rotating machine comprises a rotor 3 including a rotor core 1 and a plurality of permanent magnet segments 2 attached to the surface of the core, and a stator 13 surrounding the rotor 3 to define a gap therebetween and including a stator core 11 having a plurality of slots and coils 12 wound on teeth and received in the slots. In the permanent magnet rotating machine illustrated in FIG. 1, the number of (permanent magnet) poles is six (6), the number of teeth is nine (9), and the arrow associated with a permanent magnet segment indicates a direction of magnetization thereof. With regard to the permanent magnet segments, magnetic orientation is effected in a parallel magnetic field so that a direction of easy magnetization is parallel to the center axis of the magnet segment. The coils are wound on teeth as a concentrated winding and connected in Y connection of three phases: U, V and W phases. The solid circle of a coil denotes that the coil winding direction is forward and the crossing (X) of a coil denotes that the coil winding direction is backward, with respect to the plane of paper.

In AC servo motors and similar motors requiring high precision torque control, the torque must have less ripples. Accordingly, it is undesired that when the permanent magnets rotate, the alignment of stator slots and the permanent magnets causes cogging torque to develop due to variations of the magnetic flux distribution across the gap (i.e., torque without current flowing across the coil) or torque ripples to occur when driven by current flowing across the coil. The torque ripples exacerbate controllability and additionally, cause noise. The cogging torque may be reduced by configuring a permanent magnet segment to a cross-sectional shape that tapers from the center toward transverse ends as shown in FIG. 1. With this configuration, the end portion of a permanent magnet segment which is a magnetic pole switch area developing a noticeable variation of magnetic flux distribution produces a smoothened magnetic flux distribution, reducing the cogging torque.

When electric current flows across coils, magnetic fields are developed in the directions of broad arrows depicted in the stator core region, so that the rotor is rotated counterclockwise. At this point, an aft area of a permanent magnet segment in the rotating direction (a circled area in FIG. 1) is in a situation susceptible to demagnetization because the magnetic field is in an opposite direction to the magnetization of the permanent magnet segment. Demagnetization would not only reduce the driving torque, but also give rise to the problem of increased cogging torque due to locally uneven magnetic field.

End portions of an off-centered permanent magnet are very thin and susceptible to demagnetization. Now the reason why a thin gage magnet is susceptible to demagnetization is described. The magnitude of demagnetization of a permanent magnet is determined by the magnitude of a coercive force and the magnitude of a diamagnetic field at the service temperature. The demagnetization susceptibility increases as the coercive force is lower and as the diamagnetic field is greater. The diamagnetic field is the sum of a self diamagnetic field created by magnetization of a permanent magnet and a reverse magnetic field from the exterior while the self diamagnetic field is greater as the thickness of the permanent magnet in the magnetization direction is reduced.

It was then proposed in JP-A 61-139252 to produce a composite magnet by integrally joining a permanent magnet having a lower coercive force and a higher remanence as a non-demagnetizable portion with another permanent magnet having a higher coercive force and a lower remanence as a demagnetizable portion. This method often leads to a reduced motor output because the permanent magnet having a higher coercive force is inevitably accompanied with a lowering of remanence.

As used herein, the term "off-centered" arrangement means that permanent magnet segments are circumferentially arranged such that a small circle delineating the arcuate portion of the segment is off-centered from a great circle circumscribing the apexes of the arcuate portions of the segments.

Reference should be made to a concurrently filed application based on Japanese Patent Application No. 2006-233442.

DISCLOSURE OF THE INVENTION

An object of the invention is to provide a permanent magnet rotating machine using a permanent magnet which is increased in coercive force without sacrifice of remanence so that it is best suited for use in a rotating machine, and more specifically, an R—Fe—B sintered magnet having an increased coercive force at end portions thereof (wherein R is one or more elements selected from rare earth elements inclusive of Y and Sc).

The inventors have found that when a $R^1$—Fe—B sintered magnet, typically a Nd—Fe—B sintered magnet, on which surface is disposed a powder comprising one or more of an oxide of $R^2$, a fluoride of $R^3$ and an oxyfluoride of $R^4$, is heated, $R^2$, $R^3$ or $R^4$ contained in the powder is absorbed in the magnet body (wherein each of $R^1$ to $R^4$ is one or more elements selected from rare earth elements inclusive of Y and Sc) so that the coercive force is increased while substantially suppressing a decline of remanence. Particularly when a fluoride of $R^3$ or an oxyfluoride of $R^4$ is used, both $R^3$ or $R^4$ and fluorine are effectively absorbed in the magnet body so that a sintered magnet having a high remanence and a high coercive force is obtainable.

According to the invention, there is provided a permanent magnet rotating machine comprising a rotor including a rotor core and a plurality of permanent magnet segments attached to the side surface of the rotor core, and a stator surrounding the rotor to define a gap therebetween and including a stator core having a plurality of slots and windings received in the slots. The permanent magnet segments each have a cross-sectional shape including a central portion having a first thickness and transversely opposed end portions having a second thickness which is less than the first thickness. The permanent magnet segments are obtained by disposing a powder on a surface of a sintered magnet body of $R^1$—Fe—B composition wherein $R^1$ is at least one element selected from rare earth elements inclusive of Y and Sc, said powder comprising at least one compound selected from the group consisting of an oxide of $R^2$, a fluoride of $R^3$, and an oxyfluoride of $R^4$ wherein each of $R^2$, $R^3$, and $R^4$ is at least one element selected from rare earth elements inclusive of Y and Sc, and heat treating the magnet body and the powder at a temperature equal to or below the sintering temperature of the magnet body in vacuum or in an inert gas so that the permanent magnet segment has a higher coercive force at the transversely opposed end portions than at the central portion.

In a preferred embodiment, prior to the heat treatment, the magnet body is configured to include a maximum side having a dimension of up to 100 mm and a minimum side having a dimension of up to 10 mm in a magnetic anisotropy direction. In a preferred embodiment, the magnet body includes a central portion having a first thickness and transversely opposed end portions having a second thickness, with a ratio of the second thickness to the first thickness being equal to or less than 0.8:1. Typically, the magnet body is C- or D-shaped in cross section.

In a preferred embodiment, the step of disposing a powder on a surface of a sintered magnet body includes locally disposing the powder on the surface of transversely opposed portions of the magnet body. In a preferred embodiment, the powder is disposed on the magnet body surface in an amount corresponding to an average filling factor of at least 10% by volume in a magnet body-surrounding space at a distance equal to or less than 1 mm from the magnet body surface. Typically, the powder has an average particle size equal to or less than 100 μm.

BENEFITS OF THE INVENTION

The permanent magnet used in the rotating machine of the invention is increased in coercive force without substantial sacrifice of remanence so that it is best suited for use in a rotating machine. More specifically, the permanent magnet has an increased coercive force at end portions thereof and is unsusceptible to demagnetization even at elevated temperature.

BRIEF DESCRIPTION OF THE DRAWINGS

In the following description, like reference characters designate like or corresponding parts throughout the several views shown in the figures.

DESCRIPTION OF THE PREFERRED EMBODIMENT

Figure 1:
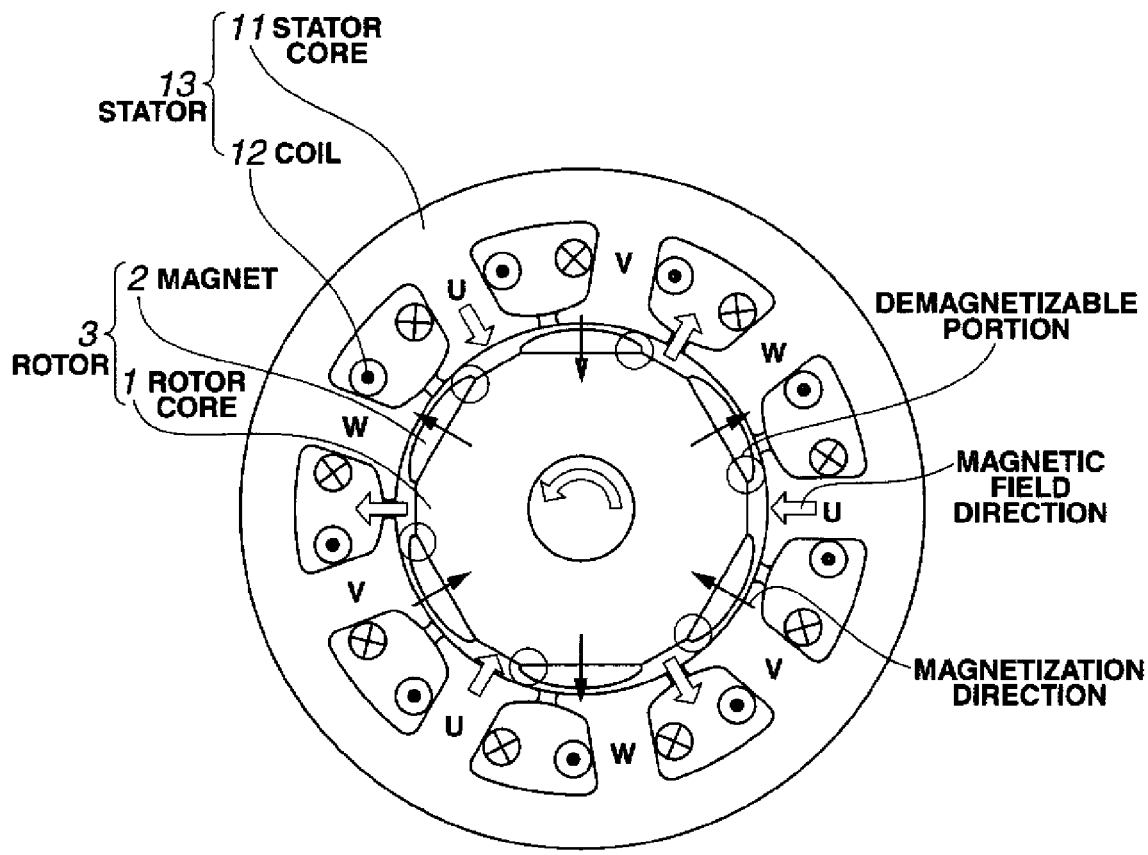
FIG. 1 is a cross-sectional view of a 6 pole, 9 slot, surface-mounted permanent magnet motor.
Figure 2A:
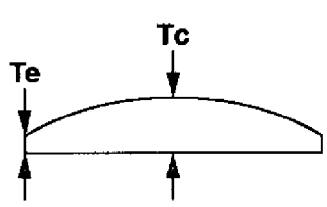
FIGS. 2a, 2b and 2c show cross-sectional shapes of magnet bodies according to the invention.
Figure 2B:
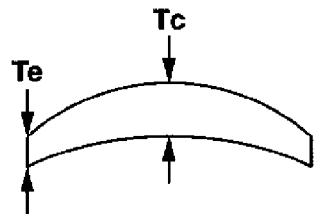
Figure 2C:
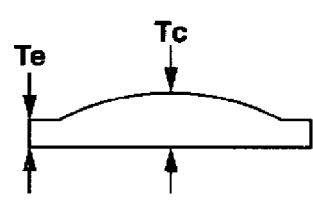

Briefly stated, the invention relates to a permanent magnet rotating machine comprising permanent magnet segments having a high coercive force sufficient for use in a rotating machine, and more specifically, permanent magnet segments having a high coercive force at end portions thereof.

The permanent magnet segments are obtained from an elongated sintered magnet block of $R^1$—Fe—B composition wherein $R^1$ is at least one element selected from rare earth elements inclusive of Y and Sc, by machining it into an off-centered magnet body having a cross-sectional shape including a central portion having a first thickness and transversely opposed end portions having a second thickness which is less than the first thickness. Disposed on a surface of the sintered magnet body is a powder comprising at least one compound selected from among an oxide of $R^2$, a fluoride of $R^3$, and an oxyfluoride of $R^4$ wherein each of $R^2$, $R^3$, and $R^4$ is at least one element selected from rare earth elements inclusive of Y and Sc. The magnet body covered with the powder is heat treated at a temperature equal to or below the sintering temperature of the magnet body in vacuum or in an inert gas. The resulting permanent magnet segment has a higher coercive force at the transversely opposed end portions than at the central portion.

The R—Fe—B sintered magnet body is obtainable from a mother alloy by a standard procedure including crushing, fine pulverization, compaction and sintering.

As used herein, both R and $R^1$ are selected from rare earth elements inclusive of Y and Sc. R is mainly used for the finished magnet body while $R^1$ is mainly used for the starting material.

The mother alloy contains $R^1$, iron (Fe), and boron (B). $R^1$ is at least one element selected from rare earth elements inclusive of Y and Sc, specifically from among Y, Sc, La, Ce, Pr, Nd, Sm, Eu, Gd, Tb, Dy, Ho, Er, Yb, and Lu, with Nd, Pr and Dy being preferably predominant. It is preferred that rare earth elements inclusive of Y and Sc account for 10 to 15 atom %, more preferably 12 to 15 atom % of the overall alloy. Desirably $R^1$ contains at least 10 atom %, especially at least 50 atom % of Nd and/or Pr based on the entire $R^1$. It is preferred that boron account for 3 to 15 atom %, more preferably 4 to 8 atom % of the overall alloy. The alloy may further contain at least one element selected from among Al, Cu, Zn, In, Si, P, S, Ti, V, Cr, Mn, Ni, Ga, Ge, Zr, Nb, Mo, Pd, Ag, Cd, Sn, Sb, Hf, Ta, and W, in an amount of 0 to 11 atom %, especially 0.1 to 5 atom. The balance consists of iron (Fe) and incidental impurities such as carbon (C), nitrogen (N) and oxygen (O). The content of Fe is preferably at least 50 atom %, especially at least 65 atom % of the overall alloy. It is acceptable that cobalt (Co) substitute for a part of Fe, specifically 0 to 40 atom %, more specifically 0 to 15 atom % of Fe.

The mother alloy is prepared by melting metal or alloy feeds in vacuum or an inert gas atmosphere, preferably argon atmosphere, and casting the melt into a flat mold or book mold or strip casting. A possible alternative is a so-called two-alloy process involving separately preparing an alloy approximate to the $R_2Fe_{14}B$ compound composition constituting the primary phase of the relevant alloy and an R-rich alloy serving as a liquid phase aid at the sintering temperature, crushing, then weighing and mixing them. The alloy approximate to the primary phase composition may be prepared by strip casting, for example. Notably, the alloy approximate to the primary phase composition is subjected to homogenizing treatment, if necessary, for the purpose of increasing the amount of the $R_2Fe_{14}B$ compound phase, since α-Fe is likely to be left depending on the cooling rate during casting and the alloy composition. The homogenizing treatment is a heat treatment at 700 to 1,200° C. for at least one hour in vacuum or in an Ar atmosphere. To the R-rich alloy serving as a liquid phase aid, the melt quenching and strip casting techniques are applicable as well as the above-described casting technique.

In the pulverizing step to be described below, the alloy powder may be admixed with at least one of carbides, nitrides, oxides and hydroxides of $R^1$ or a mixture or composite thereof in an amount of 0.005 to 5% by weight.

The alloy is generally crushed to a size of 0.05 to 3 mm, especially 0.05 to 1.5 mm. The crushing step uses a Brown mill or hydriding pulverization, with the hydriding pulverization being preferred for those alloys as strip cast. The coarse powder is then finely divided to a size of 0.2 to 30 μm, especially 0.5 to 20 μm, for example, by a jet mill using high-pressure nitrogen. The fine powder is compacted on a compression molding machine under a magnetic field and then placed in a sintering furnace where it is sintered in vacuum or in an inert gas atmosphere usually at a temperature of 900 to 1,250° C., preferably 1,000 to 1,100° C.

The sintered magnet thus obtained contains 60 to 99% by volume, preferably 80 to 98% by volume of the tetragonal $R_2Fe_{14}B$ compound as the primary phase, with the balance being 0.5 to 20% by volume of an R-rich phase, 0 to 10% by volume of a B-rich phase, and at least one of carbides, nitrides, oxides and hydroxides resulting from incidental impurities or additives, or a mixture or composite thereof.

According to the method described above, a permanent magnet can be produced by compacting an alloy powder in a magnetic field and sintering the compact. If necessary, the sintered block is machined by a grinding tool, cutting tool, wire saw or the like into a magnet body having a shape suited for use in electric motors, and preferably a cross-sectional shape including a central portion having a first thickness Tc and transversely opposed end portions having a second thickness Te which is less than the first thickness Tc, specifically C- or D-shape having an arcuate side, as shown in FIGS. 2a to 2c and 3. The reduced thickness of transversely opposed end portions of a magnet body is effective for reducing cogging torque. Although the thickness Tc of the central portion and the thickness Te of the end portions are not particularly limited, the ratio of Te/Tc is preferably set at 0.8/1 or below, more preferably between 0.1/1 and 0.5/1, and most preferably between 0.1/1 and 0.4/1 for reducing cogging torque.

The dimensions of a magnet body are not particularly limited. The amount of $R^2$, $R^3$ or $R^4$ absorbed into the magnet body from the powder deposited on the magnet surface and comprising at least one of $R^2$ oxide, $R^3$ fluoride and $R^4$ oxyfluoride increases as the specific surface area of the magnet body is larger, i.e., the size thereof is smaller. For this reason, the magnet body illustrated in FIG. 3 includes a maximum side having a dimension L or W of up to 100 mm, preferably up to 50 mm, and more preferably up to 20 mm, and a minimum side having a dimension Te of up to 10 mm, preferably up to 5 mm, and more preferably up to 2 mm in the direction of magnetic anisotropy. Most preferably, the dimension Te of the minimum side in the magnetic anisotropy direction is up to 1 mm.

With respect to the dimension of the maximum side and the dimension of the minimum side in the magnetic anisotropy direction, no particular lower limit is imposed. Preferably, the dimension of the maximum side is at least 0.1 mm and the dimension of the minimum side in the magnetic anisotropy direction is at least 0.05 mm.

Figure 4:
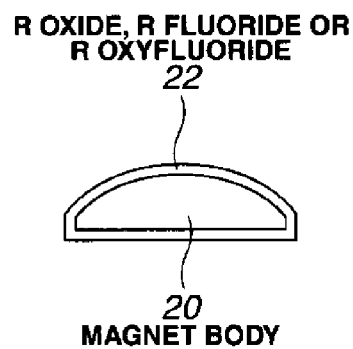
FIG. 4 is a cross-sectional view of a magnet body covered on the entire surface with a powder containing R oxide, R fluoride, R oxyfluoride or a mixture thereof.

After machining, a powder 22 comprising at least one compound selected from among an oxide of $R^2$, a fluoride of $R^3$, and an oxyfluoride of $R^4$ is disposed on the surface of a (machined) magnet body 20 as shown in FIG. 4. As defined above, each of $R^2$, $R^3$ and $R^4$ is at least one element selected from rare earth elements inclusive of Y and Sc, and should preferably contain at least 10 atom %, more preferably at least 20 atom %, and even more preferably at least 40 atom % of Dy or Tb. With respect to the powder comprising $R^3$ fluoride and/or $R^4$ oxyfluoride, it is preferred that $R^3$ and/or $R^4$ contain at least 10 atom % of Dy and/or Tb, and the total concentration of Nd and Pr in $R^3$ and/or $R^4$ be lower than the total concentration of Nd and Pr in $R^1$.

Figure 5:
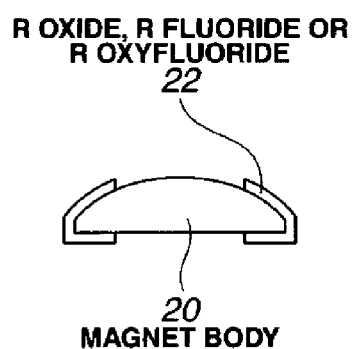
FIG. 5 is a cross-sectional view of a magnet body covered locally on the surface of end portions with a powder containing R oxide, R fluoride, R oxyfluoride or a mixture thereof.

The magnet body may be entirely or locally covered with the powder. In FIG. 4, the powder 22 covers the entire surface of the magnet body 20, which is subjected to absorption treatment. In FIG. 5, the powder 22 is disposed on part of the surface of the magnet body, typically on the surface (of at least an arcuate side) of one or preferably both of transversely opposed end portions of the magnet body 20, which is subjected to absorption treatment. In a further embodiment, the magnet body 20 covered with the powder 22 over its entire surface is subjected to absorption treatment, after which the magnet body 20 covered locally with the powder 22 only over one end portion, preferably both end portions is subjected to absorption treatment again.

For the reason that a more amount of $R^2$, $R^3$ or $R^4$ is absorbed as the filling factor of the powder in the magnet surface-surrounding space is higher, the filling factor should preferably be at least 10% by volume, more preferably at least 40% by volume, calculated as an average value in the magnet surrounding space from the magnet surface to a distance equal to or less than 1 mm.

One exemplary technique of disposing or applying the powder is by dispersing a powder comprising one or more compounds selected from an oxide of $R^2$, a fluoride of $R^3$, and an oxyfluoride of $R^4$ in water or an organic solvent to form a slurry, immersing the magnet body in the slurry, and drying in hot air or in vacuum or drying in the ambient air. Alternatively, the powder can be applied by spray coating or the like. Any such technique is characterized by ease of application and mass treatment.

The particle size of the powder affects the reactivity when the $R^2$, $R^3$ or $R^4$ component in the powder is absorbed in the magnet. Smaller particles offer a larger contact area that participates in the reaction. In order for the invention to attain its effects, the powder disposed on the magnet should desirably have an average particle size equal to or less than 100 µm, preferably equal to or less than 10 µm. No particular lower limit is imposed on the particle size although a particle size of at least 1 nm is preferred. It is noted that the average particle size is determined as a weight average diameter $D_{50}$ (particle diameter at 50% by weight cumulative, or median diameter) using, for example, a particle size distribution measuring instrument relying on laser diffractometry or the like.

The oxide of $R^2$, fluoride of $R^3$, and oxyfluoride of $R^4$ used herein are typically $R^2_2O_3$, $R^3F_3$, and $R^4OF$, respectively, although they generally refer to oxides containing $R^2$ and oxygen, fluorides containing $R^3$ and fluorine, and oxyfluorides containing $R^4$, oxygen and fluorine, additionally including $R^2O_n$, $R^3F_n$, and $R^4O_mF_n$ wherein m and n are arbitrary positive numbers, and modified forms in which part of $R^2$ to $R^4$ is substituted or stabilized with another metal element as long as they can achieve the benefits of the invention.

The powder disposed on the magnet surface contains the oxide of $R^2$, fluoride of $R^3$, oxyfluoride of $R^4$ or a mixture thereof, and may additionally contain at least one compound selected from among carbides, nitrides, hydroxides and hydrides of $R^5$, or a mixture or composite thereof wherein $R^5$ is at least one element selected from rare earth elements inclusive of Y and Sc. When $R^3$ fluoride and/or $R^4$ oxyfluoride is used, the powder may contain an oxide of $R^5$. Further, the powder may contain a fine powder of boron, boron nitride, silicon, carbon or the like, or an organic compound such as a fatty acid (e.g., stearic acid) in order to promote the dispersion or chemical/physical adsorption of the powder. In order for the invention to attain its effect efficiently, the powder contains at least 10% by weight, preferably at least 20% by weight (based on the entire powder) of the oxide of $R^2$, fluoride of $R^3$, oxyfluoride of $R^4$ or a mixture thereof. In particular, it is recommended that the powder contain at least 50% by weight, preferably at least 70% by weight, even more preferably at least 90% by weight (based on the entire powder) of the oxide of $R^2$, fluoride of $R^3$, oxyfluoride of $R^4$ or a mixture thereof.

After the powder comprising the oxide of $R^2$, fluoride of $R^3$, oxyfluoride of $R^4$ or a mixture thereof is disposed on the magnet body surface as described above, the magnet body and the powder are heat treated in vacuum or in an atmosphere of an inert gas such as argon (Ar) or helium (He). This heat treatment is referred to as "absorption treatment." The absorption treatment temperature is equal to or below the sintering temperature (designated Ts in ° C.) of the magnet body.

If heat treatment is effected above the sintering temperature Ts, there arise problems that (1) the structure of the sintered magnet can be altered to degrade magnetic properties, (2) the machined dimensions cannot be maintained due to thermal deformation, and (3) R can diffuse not only at grain boundaries, but also into the interior of the magnet body, detracting from remanence. For this reason, the temperature of heat treatment is equal to or below Ts° C. of the magnet body, and preferably equal to or below (Ts-10)° C. The lower limit of temperature may be selected as appropriate though it is typically at least 350° C. The time of heat treatment is typically from 1 minute to 100 hours. Within less than 1 minute, the absorption treatment is not complete. If over 100 hours, the structure of the sintered magnet can be altered and oxidation or evaporation of components inevitably occurs to degrade magnetic properties. The preferred time of heat treatment is from 5 minutes to 8 hours, and more preferably from 10 minutes to 6 hours.

Through the absorption treatment, $R^2$, $R^3$ or $R^4$ contained in the powder disposed on the magnet surface is concentrated in the rare earth-rich grain boundary component within the magnet so that $R^2$, $R^3$ or $R^4$ is incorporated in a substituted manner near a surface layer of $R_2Fe_{14}B$ primary phase grains. Where the powder contains the fluoride of $R^3$ or oxyfluoride of $R^4$, part of the fluorine in the powder is absorbed in the magnet along with $R^3$ or $R^4$ to promote a supply of $R^3$ or $R^4$ from the powder and the diffusion thereof along grain boundaries in the magnet.

The rare earth element contained in the oxide of $R^2$, fluoride of $R^3$ or oxyfluoride of $R^4$ is one or more elements selected from rare earth elements inclusive of Y and Sc. Since the elements which are particularly effective for enhancing magnetocrystalline anisotropy when concentrated in a surface layer are Dy and Tb, it is preferred that a total of Dy and Tb account for at least 10 atom % and more preferably at least 20 atom % of the rare earth elements in the powder. Also preferably, the total concentration of Nd and Pr in $R^2$, $R^3$ and $R^4$ is lower than the total concentration of Nd and Pr in $R^1$.

The absorption treatment effectively increases the coercive force of the R—Fe—B sintered magnet without substantial sacrifice of remanence.

The absorption treatment may be carried out, for example, by dispersing the powder in water or an organic solvent to form a slurry, immersing the sintered magnet body in the slurry, and heat treating the magnet body having the powder deposited on its surface. Since a plurality of magnet bodies covered with the powder are spaced apart from each other during the absorption treatment, it is avoided that the magnet bodies are fused together after the absorption treatment which is a heat treatment at a high temperature. In addition, the powder is not fused to the magnet bodies after the absorption treatment. It is then possible to place a multiplicity of magnet bodies in a heat treating container where they are treated simultaneously. The preparing method of the magnet is highly productive.

The absorption treatment is preferably followed by aging treatment. The aging treatment is desirably at a temperature which is below the absorption treatment temperature, preferably from 200° C. to a temperature lower than the absorption treatment temperature by 10° C., more preferably from 350° C. to a temperature lower than the absorption treatment temperature by 10° C. The atmosphere is preferably vacuum or an inert gas such as Ar or He. The time of aging treatment is preferably from 1 minute to 10 hours, more preferably from 10 minutes to 5 hours, and even more preferably from 30 minutes to 2 hours.

Notably, during machining of the sintered magnet block prior to the coverage thereof with the powder, the machining tool may use an aqueous cooling fluid or the machined surface may be exposed to a high temperature. If so, there is a likelihood that the machined surface is oxidized to form an oxide layer thereon. This oxide layer sometimes inhibits the absorption reaction of $R^2$, $R^3$ or $R^4$ from the powder into the magnet body. In such a case, the magnet body as machined is washed with at least one of alkalis, acids and organic solvents or shot blasted for removing the oxide layer.

Suitable alkalis which can be used herein include potassium pyrophosphate, sodium pyrophosphate, potassium citrate, sodium citrate, potassium acetate, sodium acetate, potassium oxalate, sodium oxalate, etc. Suitable acids include hydrochloric acid, nitric acid, sulfuric acid, acetic acid, citric acid, tartaric acid, etc. Suitable organic solvents include acetone, methanol, ethanol, isopropyl alcohol, etc. In the washing step, the alkali or acid may be used as an aqueous solution with a suitable concentration not attacking the magnet body.

Alternatively, the surface layer on the sintered magnet body may be removed by shot blasting before the powder is disposed on the sintered magnet body.

Also, after the absorption treatment or after the subsequent aging treatment, the magnet body may be washed with at least one agent selected from alkalis, acids and organic solvents, or machined again into a practical shape. Alternatively, plating or paint coating may be carried out after the absorption treatment, after the aging treatment, after the washing step, or after the last machining step.

As a result of absorption into the sintered magnet via its surface of Dy and Tb which are particularly effective for enhancing magnetocrystalline anisotropy, the coercive force of R—Fe—B sintered magnet is increased efficiently at little or no sacrifice of remanence. Because of this absorption mechanism, the increment of coercive force varies with the thickness of the sintered magnet body. Specifically, in a sintered magnet body having tapered end portions, the coercive force is effectively increased at the end portions.

The permanent magnet thus obtained has tapered end portions which are suitable for reducing cogging torque. By increasing the coercive force of end portions, it overcomes the problem that thin end portions are susceptible to demagnetization. Additionally, it has a high remanence. It is thus suited for use in a rotating machine. It ensures to manufacture a permanent magnet rotating machine comprising a rotor including a rotor core and a plurality of permanent magnet segments attached to the side surface of the rotor core, and a stator surrounding the rotor to define a gap therebetween and including a stator core having a plurality of slots and windings received in the slots. Except that the permanent magnet segments having undergone absorption treatment are used, the rotating machine may take any well-known construction and be constructed by any well-known procedure.

One exemplary permanent magnet rotating machine comprises a rotor including a rotor core yoke and a plurality of permanent magnet segments arranged on the side surface of the rotor core yoke at predetermined intervals such that the polarity is alternately opposite in a circumferential direction of the rotor core yoke, and a stator surrounding the rotor to define a gap therebetween and including a stator core yoke, salient magnetic poles arranged on the stator core yoke at predetermined intervals in a circumferential direction thereof and opposed to said permanent magnet segments, and armature windings concentratedly wound on the salient magnetic poles and connected in three-phase connection.

The number of magnet segments used in the machine is not particularly limited. Typically an even number of at most 100 magnet segments, and preferably 4 to 36 magnet segments are circumferentially arranged so that the polarity is alternately opposite in the circumferential direction.

EXAMPLE

Examples are given below for further illustrating the invention although the invention is not limited thereto. In Examples, the filling factor (or percent occupancy) of the magnet surface-surrounding space with powder like dysprosium oxide or dysprosium fluoride is calculated from a weight gain of the magnet after powder deposition and the true density of powder material.

Examples 1 to 4 and Comparative Examples 1 to 3

[Magnetic Properties]

An alloy in thin plate form was prepared by a strip casting technique, specifically by weighing Nd, Co, Al, and Fe metals having a purity of at least 99% by weight and ferroboron, high-frequency heating in an argon atmosphere for melting, and casting the alloy melt on a copper single roll. The resulting alloy consisted of 13.5 atom % Nd, 1.0 atom % Co, 0.5 atom % Al, 5.8 atom % B, and the balance of Fe. It is designated Alloy A. Through hydriding pulverization involving causing the alloy to occlude hydrogen and then heating at 500° C. for partial dehydriding while evacuating to vacuum, Alloy A was pulverized into a coarse powder under 30 mesh.

Separately, an ingot was prepared by weighing Nd, Tb, Fe, Co, Al and Cu metals having a purity of at least 99% by weight and ferroboron, high-frequency heating in an argon atmosphere for melting, and casting the alloy melt. The alloy consisted of 20 atom % Nd, 10 atom % Tb, 24 atom % Fe, 6 atom % B, 1 atom % Al, 2 atom % Cu, and the balance of Co. It is designated Alloy B. Using a Brown mill in a nitrogen atmosphere, Alloy B was crushed into a coarse powder under 30 mesh.

Figure 3:
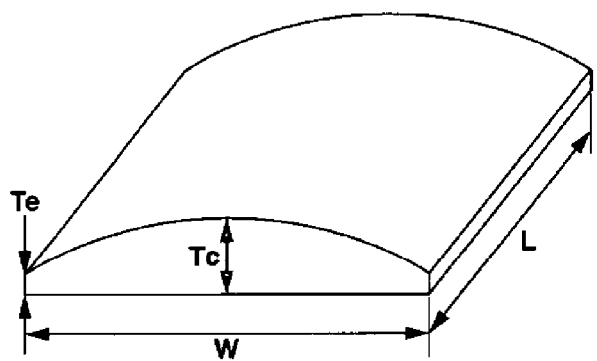
FIG. 3 is a perspective view of a magnet body.

The powders of Alloys A and B were weighed in amounts of 90 wt % and 10 wt %, respectively, and mixed for 30 minutes in a nitrogen blanketed V-blender. On a jet mill using high-pressure nitrogen gas, the mixed powder was pulverized into a fine powder having a mass median particle diameter of 4 μm. The resulting mixed fine powder was compacted in a nitrogen atmosphere under a pressure of about 1 ton/cm$^2$ while being oriented in a magnetic field of 15 kOe. The green compact was then placed in a sintering furnace in an argon atmosphere where it was sintered at 1,060° C. for 2 hours, obtaining a permanent magnet block of 71 mm×45 mm×10 mm thick (in the magnetic anisotropy direction). Using a diamond grinding tool, the permanent magnet block was machined on all the surfaces into magnet bodies having a D-shaped cross-section as shown in FIG. 3. Specifically, the magnet body of Shape 1 had dimensions: L=70 mm, W=45 mm, Tc=9 mm and Te=3 mm. The magnet body of Shape 2 had dimensions: L=70 mm, W=15 mm, Tc=3 mm and Te=1 mm. Note that dimensions Tc and Te are aligned with the magnetic anisotropy direction. As compared with the dimensions of Shape 2, the dimensions of Shape 1 are equal in length (L) direction, and three times in width (W) and thickness (T) directions. The magnet bodies as machined were successively washed with alkaline solution, deionized water, acid solution, and deionized water, and dried.

Subsequently, dysprosium fluoride having an average particle size of 5 μm was mixed with ethanol at a weight fraction of 50% to form a suspension, in which the magnet body was immersed for 1 minute with ultrasonic waves being applied. The magnet body was pulled up and immediately dried with hot air. At this point, the dysprosium fluoride surrounded the magnet body and occupied a magnet surface-surrounding space at a filling factor of 45% by volume. The magnet body covered with dysprosium fluoride was subjected to absorption treatment in an argon atmosphere at 900° C. for one hour. The magnet body was then subjected to aging treatment at 500° C. for one hour, and quenched, obtaining a magnet body. The magnet body of Shape 1 as treated is designated M1, and the magnet body of Shape 2 as treated is designated M2.

For comparison purposes, magnet bodies were prepared by subjecting the same magnet bodies to only heat treatment (without powder coverage). The magnet bodies of Shapes 1 and 2 as treated are designated P1 and P2, respectively.

Separately, a magnet body having the same shape as M2 and P2 was immersed in a suspension of 50 wt % terbium fluoride having an average particle size of 5 μm in ethanol for 1 minute under ultrasonic agitation. The magnet body was pulled up and immediately dried with hot air. At this point, the terbium fluoride occupied a magnet surface-surrounding space at a filling factor of 45%. It was subjected to absorption treatment in an argon atmosphere at 900° C. for one hour, then to aging treatment at 500° C. for one hour, and quenched, obtaining a magnet body designated M3.

Separately, each of opposed end portions of a magnet body having the same shape as M2, M3 and P2 was immersed to a depth of 4 mm in a suspension of 50 wt % terbium fluoride having an average particle size of 5 μm in ethanol for 1 minute under ultrasonic agitation. The magnet body was pulled up and immediately dried with hot air. The terbium fluoride occupied a magnet surface-surrounding space at a filling factor of 45% along the end portions which had been immersed and 0% along the central portion which had not been immersed. FIG. 5 illustrates a magnet body of D shape in cross section which is covered on the surface of opposed end portions with a powder containing R oxide, R fluoride, R oxyfluoride or a mixture thereof. It was subjected to absorption treatment in an argon atmosphere at 900° C. for one hour, then to aging treatment at 500° C. for one hour, and quenched, obtaining a magnet body designated M4.

The magnet bodies M1, M2, M3, M4, P1 and P2 were measured for magnetic properties, which are reported in Table 1. As compared with magnet bodies P1 and P2 which had not experienced dysprosium absorption treatment, the magnet bodies within the scope of the invention exhibited a coercive force increment of 480 to 500 kAm$^{-1}$ at the end and a coercive force increment of 300 to 450 kAm$^{-1}$ even at the center. The coercive force is lower for Shape 1 having a greater thickness, and the difference of coercive force between Shapes 1 and 2 is significant at the center. This indicates that an increment of coercive force dulls with an increasing thickness. Magnet body M3 having experienced terbium absorption treatment exhibited a coercive force increment of 800 kAm$^{-1}$ relative to magnet body P2 having not experienced terbium absorption treatment. The magnet bodies within the scope of the invention had a remanence drop of 5 mT.

For comparison purposes, a permanent magnet was prepared from the composition of Alloy A in which Dy substituted part of Nd. This change intended to achieve a coercive force increment of 500 kAm$^{-1}$, but brought a remanence drop of 50 mT. This magnet body is designated P3, magnetic properties of which are also shown in Table 1. Note that magnet body P3 was of Shape 2.

SEM backscattered electron images and EPMA analysis demonstrated that magnet bodies M1 and M2 contained Dy and F. Since Dy and F are not contained in the magnets prior to the absorption treatment, it is the absorption treatment that contributes to the presence of Dy and F within magnet bodies M1 and M2. Dy absorbed is concentrated only in proximity to grain boundaries. On the other hand, fluorine (F) is present at grain boundaries and combines with the oxide (present as an incidental impurity within the magnet prior to the treatment) to form an oxyfluoride. The distribution of Dy makes it possible to increase the coercive force while minimizing a decline of remanence.

TABLE 1

| Magnet | | Br (T) | HcJ (kAm$^{-1}$) | (BH)max (kJm$^{-3}$) |
|---|---|---|---|---|
| Example 1 | M1 End | 1.417 | 1,480 | 392 |
| | Center | 1.418 | 1,300 | 393 |
| Example 2 | M2 End | 1.415 | 1,500 | 390 |
| | Center | 1.417 | 1,450 | 392 |
| Example 3 | M3 End | 1.415 | 1,800 | 390 |
| | Center | 1.417 | 1,770 | 392 |
| Example 4 | M4 End | 1.415 | 1,800 | 390 |
| | Center | 1.418 | 1,300 | 393 |
| Comparative Example 1 | P1 End | 1.420 | 1,000 | 395 |
| | Center | 1.420 | 1,000 | 395 |
| Comparative Example 2 | P2 End | 1.420 | 1,000 | 395 |
| | Center | 1.420 | 1,000 | 395 |
| Comparative Example 3 | P3 End | 1.370 | 1,500 | 368 |
| | Center | 1.370 | 1,500 | 368 |

[Motor Characteristics]

A permanent magnet motor was assembled by mounting each of the inventive magnets M1, M2, M3 and M4 and comparative magnets P1, P2 and P3, and examined for performance. The motor is a magnet surface-mounted motor as shown in FIG. 1. The rotor has a 6-pole structure in which permanent magnet segments are attached to the surface of a laminate of 0.5 mm magnetic steel sheets. The rotors associated with magnets M1 and P1 of Shape 1 have an outer diameter (of a circle circumscribing the apexes of adjacent permanent magnet segments) of 90 mm and a length of 70 mm. The stator has a 9-slot structure formed by laminating 0.5 mm magnetic steel sheets in which a coil is a concentrated winding of 15 turns on each tooth, and the coils are in Y connection of three phases: U, V and W phases. The gap between the rotor and stator is 1 mm. In FIG. 1, the solid circle of a coil denotes that the coil winding direction is forward and the crossing (X) of a coil denotes that the coil winding direction is backward. When electric current flows across coils, magnetic fields are developed in the directions of broad arrows depicted in the stator core region, so that the rotor is rotated counterclockwise. At this point, an aft area of a permanent magnet segment in the rotating direction (a circled area in FIG. 1) is in a situation susceptible to demagnetization because the magnetic field is in an opposite direction to the magnetization of the permanent magnet segment.

The rotors associated with magnets M2, M3, P2 and P3 of Shape 2 have an outer diameter of 45 mm and a length of 70 mm. The rotor-stator gap is 1 mm.

To evaluate the degree of demagnetization, a difference in drive torque before and after the motor was exposed to temperatures of 100° C. and 120° C. was determined. First, the drive torque was measured when the motor was rotated by conducting three-phase current having a RMS value of 50 A across each coil at room temperature (RT). Next, the motor was placed in an oven where it was similarly rotated by conducting current having a RMS of 50 A. The motor was taken out of the oven, cooled down to room temperature, and similarly rotated by conducting current having a RMS of 50 A, during which the drive torque was measured. A torque reduction was calculated as follows.

A percent reduction of torque by demagnetization=
([(drive torque at RT after oven placement)−
(drive torque at RT before oven placement)]/
(drive torque at RT before oven placement)

Table 2 tabulates the values of percent reduction of drive torque by demagnetization. In the motors using the magnets having a lower coercive force of Comparative Examples 1 and 2, a demagnetization was observed at 100° C., and a marked demagnetization was observed at 120° C. It is demonstrated that these motors cannot be used in an environment at 100° C. In contrast, in the motors using the magnets having a coercive force increased by the absorption treatment of Examples 1 and 2, no demagnetization was observed at 100° C., indicating that they could be used in an environment at 100° C. At 120° C., a demagnetization of about 2% was observed in both Examples 1 and 2. When a comparison is made between magnets M1 and M2, the increment of coercive force by the absorption treatment is approximately equal at the magnet end portion because the magnet end portion has a sufficient amount of dysprosium absorbed due to a close distance from the magnet surface, but has a difference of 170 kAm$^{-1}$ at the central portion because the central portion of magnet M1 is thicker. The reduction of torque by demagnetization of the motor was approximately equal between magnets M1 and M2, despite a difference in coercive force at the central portion. The reason is that while a demagnetizable portion in a permanent magnet motor is a magnet end portion, the absorption treatment according to the invention is effective in increasing the coercive force of a magnet end portion to a greater extent. Thus a motor unsusceptible to demagnetization is available.

Example 3 is a motor using the magnet having undergone absorption treatment of terbium for increasing coercive force. No demagnetization was observed even at 120° C.

Example 4 is a motor using the magnet having undergone absorption treatment of terbium only on its end portions for increasing coercive force (see FIG. 5). No demagnetization was observed at 100° C. A slight demagnetization was observed at 120° C. Since dysprosium and terbium are expensive, it is desired to reduce the amount of these elements used. According to the invention, absorption treatment may be carried out concentratedly at a location where coercive force is necessary. This contributes to reduce the amount of dysprosium and terbium used.

In Comparative Example 3, a permanent magnet having an equivalent coercive force to Example 2 was obtained using an alloy composition in which Dy substitutes for part of Nd in Alloy A. In this motor, the reduction of torque by demagnetization was approximate to those of the other motors, but the drive torque was lower because the remanence was 3.3% lower.

TABLE 2

| | Magnet | Demagnetization (%) | |
|---|---|---|---|
| | | 100° C. | 120° C. |
| Example 1 | M1 | 0 | 2.0 |
| Example 2 | M2 | 0 | 1.8 |
| Example 3 | M3 | 0 | 0 |
| Example 4 | M4 | 0 | 0.5 |
| Comparative Example 1 | P1 | 5.6 | 11.7 |
| Comparative Example 2 | P2 | 5.6 | 11.7 |
| Comparative Example 3 | P3 | 0 | 1.8 |

Although the Examples relate to permanent magnet motors, the same advantages are achieved when the invention is applied to permanent magnet power generators, which have essentially the same structure.

Japanese Patent Application No. 2006-233442 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A permanent magnet rotating machine comprising:
   a rotor including a rotor core and a plurality of permanent magnet segments attached to the side surface of the rotor core; and
   a stator surrounding the rotor to define a gap therebetween and including a stator core having a plurality of slots and windings received in the slots, wherein
   said permanent magnet segments each have a cross-sectional shape including a central portion having a first thickness and transversely opposed end portions having a second thickness which is less than the first thickness,
   said permanent magnet segments include a sintered magnet body of $R^1$—Fe—B composition wherein $R^1$ is at least one element selected from rare earth elements inclusive of Y and Sc, an absorbed powder comprising at least one compound selected from the group consisting of an oxide of $R^2$, a fluoride of $R^3$, and an oxyfluoride of $R^4$ wherein each of $R^7$, $R^3$, and $R^4$ is at least one element selected from rare earth elements inclusive of Y and Sc, and a higher coercive force at the transversely opposed end portions than at the central portion.

2. The rotating machine of claim 1 wherein the magnet body is configured to include a maximum side having a dimension of up to 100 mm and a minimum side having a dimension of up to 10 mm in a magnetic anisotropy direction.

3. The rotating machine of claim 1 wherein said magnet body includes a central portion having a first thickness Tc and transversely opposed end portions having a second thickness Te, with a ratio of the second thickness to the first thickness (Te/Tc) being equal to or less than 0.8:1.

4. The rotating machine of claim 1 wherein said magnet body is C- or D-shaped in cross section.

5. The rotating machine of claim 1 wherein the absorbed powder has a concentration near the surface of the transversely opposed portions of the magnet body that gradually lowers towards the central portion of the magnet body.

* * * * *